(12) United States Patent
Tsirtsis et al.

(10) Patent No.: US 8,213,934 B2
(45) Date of Patent: Jul. 3, 2012

(54) AUTOMATIC SELECTION OF A HOME AGENT

(75) Inventors: George Tsirtsis, New York, NY (US);
M. Scott Corson, Gillette, NJ (US);
Vincent D. Park, Budd Lake, NJ (US)

(73) Assignee: Qualcomm Incorporated, San Diego, CA (US)

( * ) Notice: Subject to any disclaimer, the term of this patent is extended or adjusted under 35 U.S.C. 154(b) by 815 days.

(21) Appl. No.: 11/487,292

(22) Filed: Jul. 14, 2006

(65) Prior Publication Data

US 2007/0245007 A1    Oct. 18, 2007

Related U.S. Application Data

(60) Provisional application No. 60/792,017, filed on Apr. 14, 2006.

(51) Int. Cl.
*H04W 4/00* (2009.01)
(52) U.S. Cl. ................ 455/435.1; 370/395.52
(58) Field of Classification Search ............... 455/435.1
See application file for complete search history.

(56) References Cited

U.S. PATENT DOCUMENTS

| 7,277,416 B1* | 10/2007 | Chang et al. ............ 370/338 |
| 2002/0114323 A1 | 8/2002 | Chowdhury et al. |
| 2002/0133534 A1* | 9/2002 | Forslow ................ 709/200 |
| 2005/0079869 A1* | 4/2005 | Khalil et al. ............ 455/435.1 |
| 2005/0101321 A1* | 5/2005 | Ikeda et al. ............ 455/435.1 |
| 2007/0230453 A1* | 10/2007 | Giaretta et al. ............ 370/389 |

FOREIGN PATENT DOCUMENTS

| CL | 105507 | 3/2007 |
| CL | 105207 | 4/2007 |
| CL | 105407 | 4/2007 |
| JP | 2001169341 A | 6/2001 |
| JP | 2002176445 A | 6/2002 |
| WO | WO2005043821 A1 | 5/2005 |

OTHER PUBLICATIONS

Giaretta I Guardini E Demaria Tilab J Bournelle GET/INT R Lopez Univ of Murcia G: "Goals for AAA-HA Interface" IETF Standard-Working-Draft, Internet Engineering Task Force, IETF, CH, vol. mip6, No. 1, Jan. 2006.

Franck Le Basavaraj Patil Charles E Perkins Stefano Faccin Nokia: "Diameter Mobile IPv6 Application" IETF Standard-Working-Draft, Internet Engineering Task Force, IETF, CH, No. 4, Nov. 2004.

(Continued)

*Primary Examiner* — Kamran Afshar
*Assistant Examiner* — Omoniyi Obayanju
(74) *Attorney, Agent, or Firm* — Kam T. Tam

(57) ABSTRACT

The claimed subject matter relates to assigning a home agent to a wireless terminal during authentication, authorization, and/or accounting with respect to the wireless terminal. The wireless terminal can provide identifying indicia which can be relayed to a AAA server by way of a base station. The AAA server can then determine one or more home agents that can be associated with the wireless terminal. If more than one home agent can be assigned to the wireless terminal, the base station can resolve which home agent to utilize during registration of the wireless terminal. Such determination can be important with respect to MVNOs.

27 Claims, 13 Drawing Sheets

OTHER PUBLICATIONS

Calhoun Cisco Systems P et al: "Diameter Mobile IPv4 Application" IETF Standard, Internet Engineering Task Force, IETF, CH, Aug. 2005.

Calhoun Sun Microsystems Laboratories C Perkins Nokia Research Center P: "Mobile IP Network Access Identifier Extension for IPv4" IETF Standard, Internet Engineering Task Force, IETF, CH, Mar. 2000.

Yu Chen et al: "Dynamic home agent reassignment in mobile IP" Wireless Communications and Networking Conference, 2002. WCNC2002. 2002 IEEE, Piscataway, NJ, USA, IEEE, Mar. 17, 2002.

Giaretta I Guardini E Demaria Telecom Italia J Bournelle M Laurent-Maknavicius GET/INT G: "MIPv6 Authorization and Configuration based on EAP" IETF Standard-Working-Draft, Internet Engineering Task Force, IETF, CH, No. 3, Mar. 2006.

International Search Report—PCT/US07/066649, International Search Authority—European Patent Office, Sep. 19, 2007.

Taiwanese Search report—096113206—TIPO—Aug. 5, 2010.

Written Opinion—PCT/US07/066649, International Search Authority, European Patent Office, Sep. 19, 2007.

Giaretta et al. "MiPv6 Authorization and Configuration based on EAP" IEFT Standard-Working-Draft, pp. 1-37, Apr. 2005.

* cited by examiner

AUTOMATIC SELECTION OF A HOME AGENT

CROSS REFERENCE TO RELATED APPLICATION

This application claims the benefit of U.S. Provisional Patent Application No. 60/792,017, entitled METHODS AND APPARATUS FOR SUPPORTING MOBILE VIRTUAL NETWORK, and filed on Apr. 14, 2006. The entirety of this application is incorporated herein by reference.

BACKGROUND

I. Field

The following description relates generally to communications systems, and more particularly to selecting a home agent to utilize in connection with wireless terminal registration.

II. Background

Wireless networking systems have become a prevalent means to communicate with others worldwide. Wireless communication devices, such as cellular telephones, personal digital assistants, and the like have become smaller and more powerful in order to meet consumer needs and to improve portability and convenience. Consumers have become dependent upon these devices, demanding reliable service, expanded areas of coverage, additional services (e.g., web browsing capabilities), and continued reduction in size and cost of such devices.

A typical wireless communication network (e.g., employing frequency, time, and code division techniques) includes one or more base stations that provides coverage areas to subscribers as well as mobile (e.g., wireless) devices that can transmit and receive data within the coverage areas. A typical base station can simultaneously transmit multiple data streams to multiple devices for broadcast, multicast, and/or unicast services, wherein a data stream is a stream of data that can be of independent reception interest to a user device. A user device within the coverage area of that base station can be interested in receiving one, more than one or all the data streams carried by the composite stream. Likewise, a user device can transmit data to the base station or another user device.

To enable a wireless device to communicate within a wireless network, such device or a host associated therewith must be configured, which includes registering the wireless device with an entity that facilitates mobility management. In conventional cellular systems, a public-switched data network (PSDN) is utilized to determine which entity is to be associated with the wireless device. This can be important if one or more mobile virtual network operators (MVNO) has leased network infrastructure, as each MVNO can be desirably associated with a mobility management server. Thus, the wireless terminal is to be associated with a mobility management server that is leased or related to an MVNO that "owns" the subscriber utilizing the wireless device. Again, conventionally this is accomplished at the PSDN, which is a first connection point for IP in conventional networks. As networks adapt over time to enable IP connections to occur at a periphery of networks, however, new manners of determining which mobility management server to associate with a wireless terminal will become necessary.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter relates to assigning a home agent to a wireless terminal during authentication, authorization, and/or accounting with respect to the wireless terminal. The wireless terminal can provide identifying indicia which can be relayed to a AAA server by way of a base station. The AAA server can then determine one or more home agents that can be associated with the wireless terminal. If more than one home agent can be assigned to the wireless terminal, the base station can resolve which home agent to utilize during registration of the wireless terminal. Such determination can be important with respect to MVNOs.

In an aspect, a method for registering a wireless terminal with a home agent is described herein, where the method comprises receiving identifying indicia from the wireless terminal when the wireless terminal requests access to a network and providing the identifying indicia to a AAA server. The method can also include receiving an identity of at least one home agent from the AAA server, and routing registration information from a wireless terminal to an identified home agent.

A base station is also disclosed below, where the base station comprises a memory that retains instructions for receiving identifying indicia from a wireless terminal when the wireless terminal requests access to a network and providing the identifying indicia to a AAA server. The memory can further include instructions for receiving an identity of at least one home agent from the AAA server and routing registration information from a wireless terminal to an identified home agent. The base station can additionally comprise a processor that executes the instructions.

In yet another aspect, a communications apparatus can comprise means for receiving a profile associated with a subscriber from a AAA server, the profile includes an identity of a home agent that is assigned to an MVNO associated with the subscriber and means for creating a Mobile IP tunnel to the identified home agent. Additionally, a machine-readable medium can have stored thereon machine-executable instructions for receiving identifying indicia associated with a subscriber, providing the identifying indicia to a AAA server, and receiving a profile assigned to the subscriber, the profile includes one or more home agents that are assigned to an MVNO associated with the subscriber. The machine-readable medium can additionally retain instructions for selecting a home agent from the one or more home agents and routing registration information from the subscriber to the selected home agent.

In still another aspect, a processor can be configured to execute instructions for receiving a profile associated with a subscriber from a AAA server, wherein the profile includes an identity of a home agent that is assigned to an MVNO associated with the subscriber. The processor can also be configured to execute instructions for creating a Mobile IP tunnel to the identified home agent.

Moreover, described below is a method for determining one or more home agents to associate with a wireless terminal, wherein the method comprises receiving identifying indicia associated with the wireless terminal, determining at least one home agent that is associable with the wireless terminal based at least in part upon the identifying indicia, and providing an identity of the at least one home agent to a base station that is communicatively coupled to the wireless terminal. Furthermore, a AAA server is described herein, wherein the server comprises a memory that includes instructions for receiving identifying indicia associated with a wireless terminal, determining at least one home agent that is associable with the wireless terminal based at least in part upon the identifying indicia, and providing an identity of the at least one home agent to a base station that is communicatively coupled to the wireless terminal. The AAA server can also include a processor that executes the instructions.

In accordance with another aspect, a AAA server can comprise means for receiving identifying indicia related to a subscriber from a base station that is communicatively coupled to the subscriber, and means for discerning a network associated with the subscriber based at least in part upon the identifying indicia. Additionally, the AAA server can include means for determining at least one home agent assigned to the network, and means for assigning the at least one home agent to the subscriber for utilization in registration of a wireless terminal utilized by the subscriber.

In accordance with still another aspect, a machine-readable medium is described herein, wherein the machine-readable medium has instructions stored thereon for receiving identifying indicia related to a subscriber from a base station that is communicatively coupled to the subscriber and discerning an MVNO associated with the subscriber based at least in part upon the identifying indicia. The instructions within the machine-readable medium can also include determining at least one home agent assigned to the MVNO and assigning the at least one home agent to the subscriber for utilization in registration of a wireless terminal utilized by the subscriber. Furthermore, a processor is contemplated, wherein the processor is configured to execute instructions for receiving an NAI of a subscriber that is requesting access to an IP-based wireless network, determining a network associated with the subscriber based at least in part upon the received NAI, determining at least one home agent assigned to the network, associating the subscriber with the at least one home agent, and relaying the association to a base station.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Figure 1:
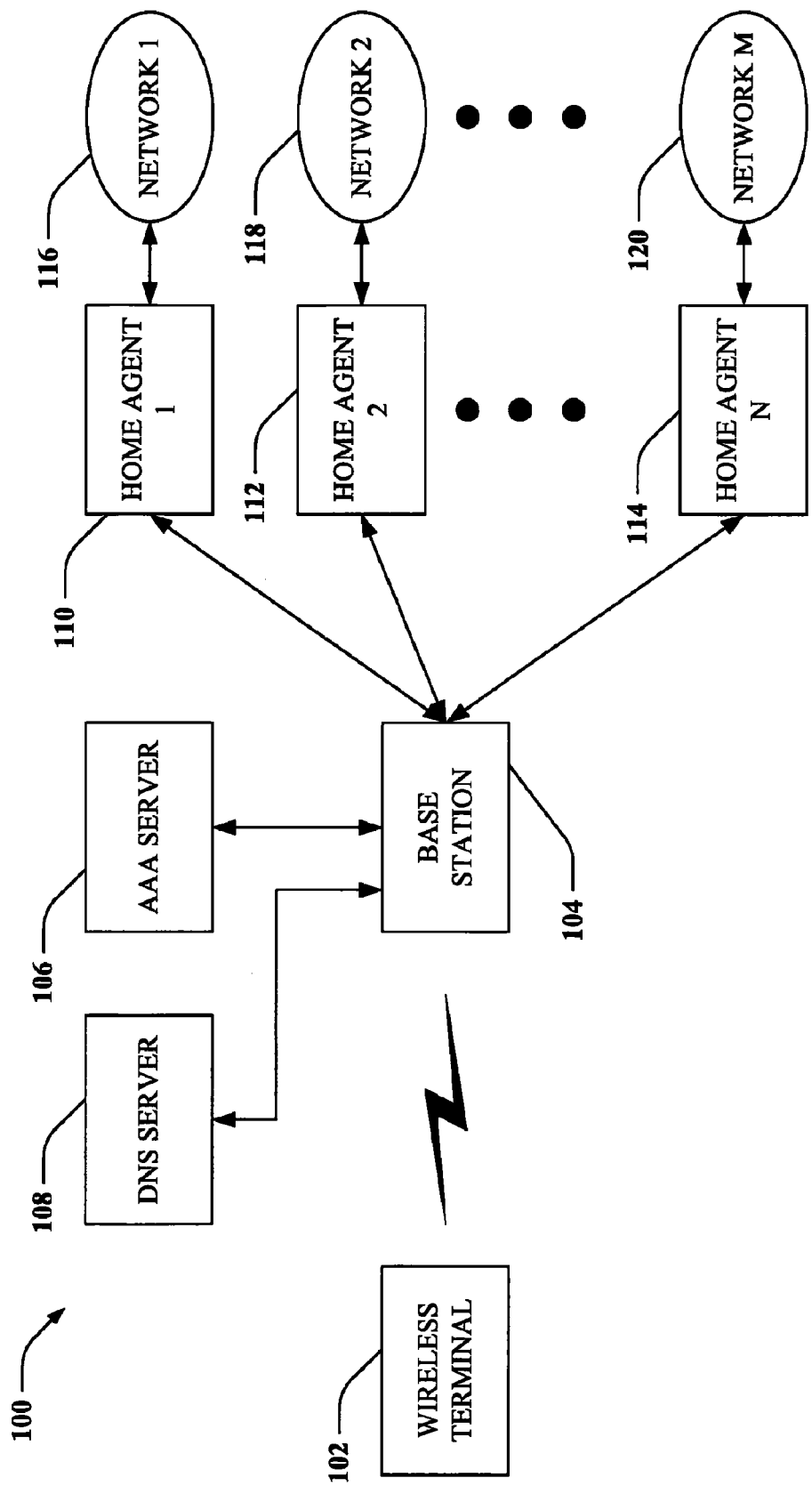
FIG. 1 is a high level block diagram of a system that is provided to illustrate determination of a home agent to associate with a wireless terminal.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the claimed subject matter.

Furthermore, various aspects are described herein in connection with a terminal. A terminal can also be called a system, a user device, a secure digital card (SD card), a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

Referring now to FIG. 1, a system 100 is shown to illustrate selection of one of several home agents to associate with a wireless terminal in connection with registering the wireless terminal with the home agent. In an example, system 100 can be a cellular-type IP system, such as one that can be utilized in connection with FLASH OFDM. System 100 includes a wireless terminal 102, which can be a mobile phone, a PCMCIA card, a memory card, a personal digital assistant, and/or the like. Wireless terminal 102 can be associated with a base station 104, such that data can be transmitted over the air between wireless terminal 102 and base station 104. To enable such communications, one or more links between wireless terminal 102 and base station 104 need to be created and configured, wherein configuration includes providing a host device (not shown) with an IP address, which can be obtained through registering wireless terminal 102 with respect to a home agent.

In some instances, a subscriber (e.g., an owner/user of wireless terminal 102) can be provided services by a particular network, such as a Mobile Virtual Network Operator (MVNO), a Virtual Private Network (VPN), or other suitable networks, and thus should be registered with a home agent that is assigned to the particular network. For example, MVNOs typically lease network infrastructure and utilize such infrastructure to provide services to subscribers associated with the MVNO. When wireless terminal 102 powers on or initially enters a network (e.g., within range of base station 104), an authentication/authorization/accounting procedure is undertaken prior to enabling wireless terminal 102 to access services associated with a network. To that end, wireless terminal 102 can provide identifying indicia to base station 104, which can in turn relay such indicia to a AAA server 106. In another example, base station 104 can resolve a particular identity of a subscriber based upon identifying indicia provided by wireless terminal 102 and transmit such identity to AAA server 106. It is understood that any suitable manner for resolving an identity of a subscriber is contemplated by the inventors and intended to fall under the scope of the hereto-appended claims. Identifying indicia provided by wireless terminal can be, for example, a network access identifier (NAI), an International Mobile Subscriber Identity (IMSI), or any other suitable identifying indicia.

Based upon such identifying indicia, AAA server 106 can determine a home agent from amongst a plurality of home agents to associate with wireless terminal 102 during registration. In an example, AAA server 106 can return a home agent address (e.g. IP address) that is specific to a "realm" of the user's NAI (e.g., usernumber@realm.com). In another example, AAA server 106 can be communicatively coupled to an indexed database and can determine a home agent address based upon review of such index given the identifying indicia. In still another example, base station 104 can include sufficient intelligence to determine a home agent that is to be assigned to wireless terminal (and an address associated with the home agent).

Still further, a profile associated with wireless terminal 102 can reside within AAA server 106, and such profile can include an address of an appropriate home agent or a host name. For instance, AAA server 106 can return a AAA-home agent host name, and base station 104 can resolve such host name in a domain name server (DNS) 108. Additionally, the profile can include a network (e.g., MVNO)—home agent hostname identifier which can be provided to base station 104, and base station 104 can resolve such host name to one or more IP addresses by way of local configuration, through DNS 108, or other suitable database.

System 100 can include N home agents 110-114, where one or more of such home agents 110-114 can be associated with a network from amongst a plurality of networks 116-120, wherein the networks 116-120 can be or include MVNOs, VPNs, and other suitable networks, such that each network can be operated independent from the others (e.g., different administrative domain, reuse of address space . . . ). Thus, multiple home agents can be associated with and/or assigned to a single network. For instance, home agent 110 can be associated with network 116, home agent 112 can be associated with network 118, home agent 114 can be associated with network 120, etc. For example, an association between a home agent and a network can mean that a home agent is directly connected to the network by way of a communication link, such as T1, ATM, Ethernet, etc. Additionally or alternatively, the home agent can be directly connected to the network through utilization of a tunnel established between the home agent and the network (e.g., MPLS, IPinIP, GRE, . . . ).

A home agent can be utilized to perform mobility management with respect to one or more wireless terminals. More particularly, a home agent can be a router that tunnels packets to and from wireless terminal 102 by way of a current point of attachment (e.g., base station 104). Based upon identifying indicia provided by wireless terminal 102 during authentication, authorization, and/or accounting, a home agent address or hostname for one of the home agents 110-114 can be identified by AAA server 106, for example, and provided to base station 104. During registration of wireless terminal 102, base station 104 can indicate that wireless terminal 102 (or a host associated therewith) should request IP configuration information from the identified home agent. Thus, base station 104 can build a tunnel (e.g., a Mobile IP tunnel) to the correct home agent.

AAA server 106 and/or base station 104 can determine an appropriate home agent to associate with wireless terminal 102 through a variety of methods/mechanisms. For instance, a subscriber utilizing wireless terminal 102 may be associated with an MVNO that can be accessed by way of several home agents, and AAA server 106 can select one of such home agents. For example, the selection can be made based upon geographic location (e.g., a home agent that is geographically most proximate to wireless terminal 102). In another example, the selection can be made based upon an ordered list, such that if AAA server 106 associates a first wireless terminal with a first home agent associated with an MVNO then AAA server will associate a second wireless terminal with a second home agent associated with the MVNO. Additionally or alternatively, AAA server 106 can utilize a weighted list to select a home address with respect to wireless terminal 106. For instance, if a first home agent is associated with greater resources than a second home agent, it would be more likely that a wireless terminal is assigned to the home agent associated with a greater amount of resources.

A particular example follows to better describe selection of a particular home agent. Wireless terminal 102 can be associated with a user that subscribes to services provided by network 116. When wireless terminal 102 connects to a network, it goes through authentication with AAA server 106. AAA server 106 can receive identifying indicia associated with wireless terminal 102 and can return an address or hostname of home agent 110 (which is assigned to network 116) to base station 104. Base station 104 thus has knowledge of to which home agent it should set up a tunnel (e.g., using Mobile IP) to connect wireless terminal 102 to network 116. For instance, base station 104 can resolve a hostname to an IP address of home agent 110 through utilization of DNS 108.

Figure 2:
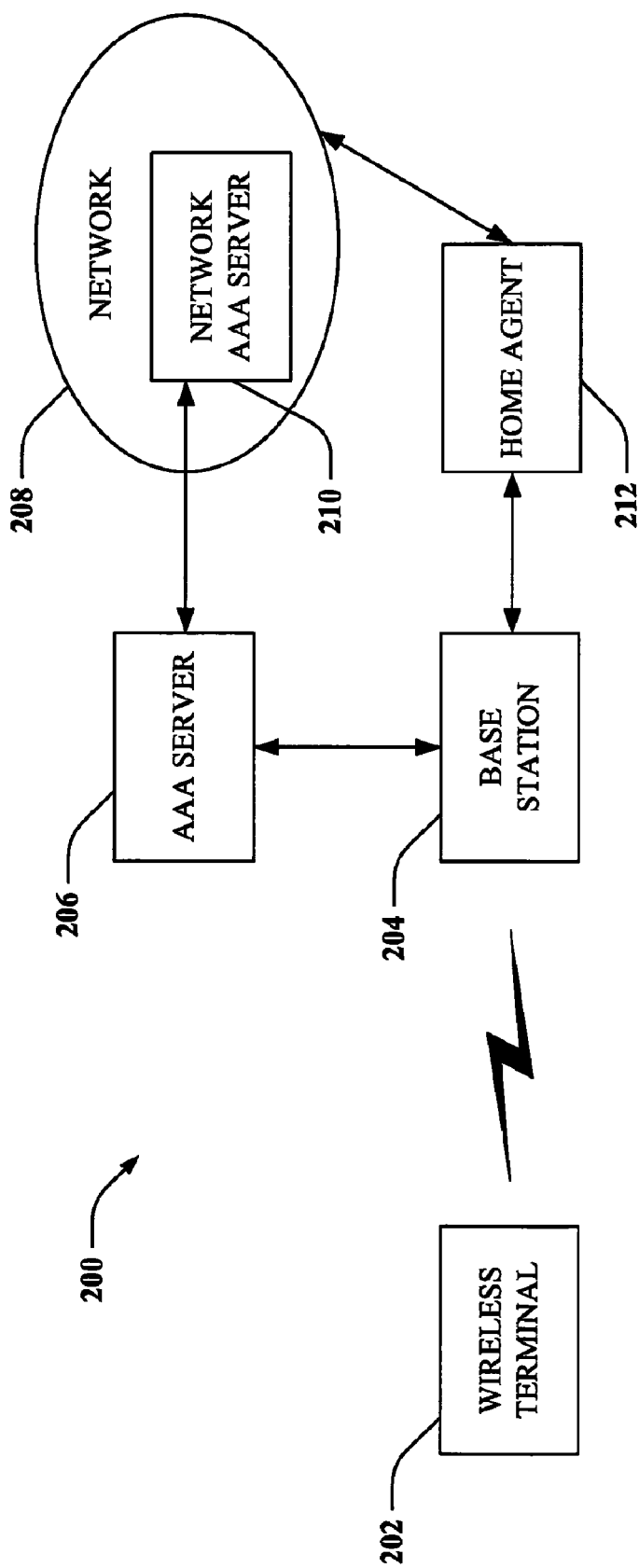
FIG. 2 is a high level block diagram of a system that is provided to illustrate determination of a home agent to associate with a wireless terminal.

Now referring to FIG. 2, a system 200 that is employed to illustrate use of a proxy in connection with determining a home agent to utilize in connection with registering a wireless terminal is shown. System 200 includes a wireless terminal 202 that is entering a network by way of a base station 204. During authentication, wireless terminal 202 can provide base station 204 with identifying indicia, such as an NAI. The NAI can be relayed to a AAA server 206, which determines a network (e.g., MVNO) 208 associated with a subscriber utilizing wireless terminal 202. Such determination can be made through analysis of a realm within the NAI, for instance. The access request can then be provided to a network AAA server 210 (e.g., a AAA server 210 that is specific to network 208). Network AAA server 210 can then authenticate wireless terminal 202 and can provide base station 204 with a specific address or host name for at least one home agent 212 that is associated with network 208. The home agent address and/or hostname can be provided to base station 204 directly or by way of AAA server 206. If base station 204 receives a hostname, it can resolve such hostname to an IP address through utilization of a DNS (not shown), for example. Other mechanisms and manners for resolving a hostname to an IP address are contemplated by the inventors and are intended to fall under the scope of the hereto-appended claims. Base station 204 can build a Mobile IP tunnel to home agent 212, wherein home agent 212 can have a preconfigured tunnel to a gateway of network 208. In another embodiment, base station 204 can allocate a network home agent by resolving a realm of network 208 to a set of home agents (e.g., by way of DNS, local configuration, and/or other suitable database).

AAA server 206 can return an address of home agent 212 to base station 204 in several different ways. For instance, base station 204 can be provided with an IP address that can be employed as is. In another example, such address can be in the form of a hostname that can be resolved to one or more IP addresses (for load balancing) by base station 204. Additionally, realm of network 208 can be provided to base station 204, and base station 204 can automatically construct a host name (e.g., homeagent.mvno) that can be resolved through utilization of a DNS.

Figure 3:
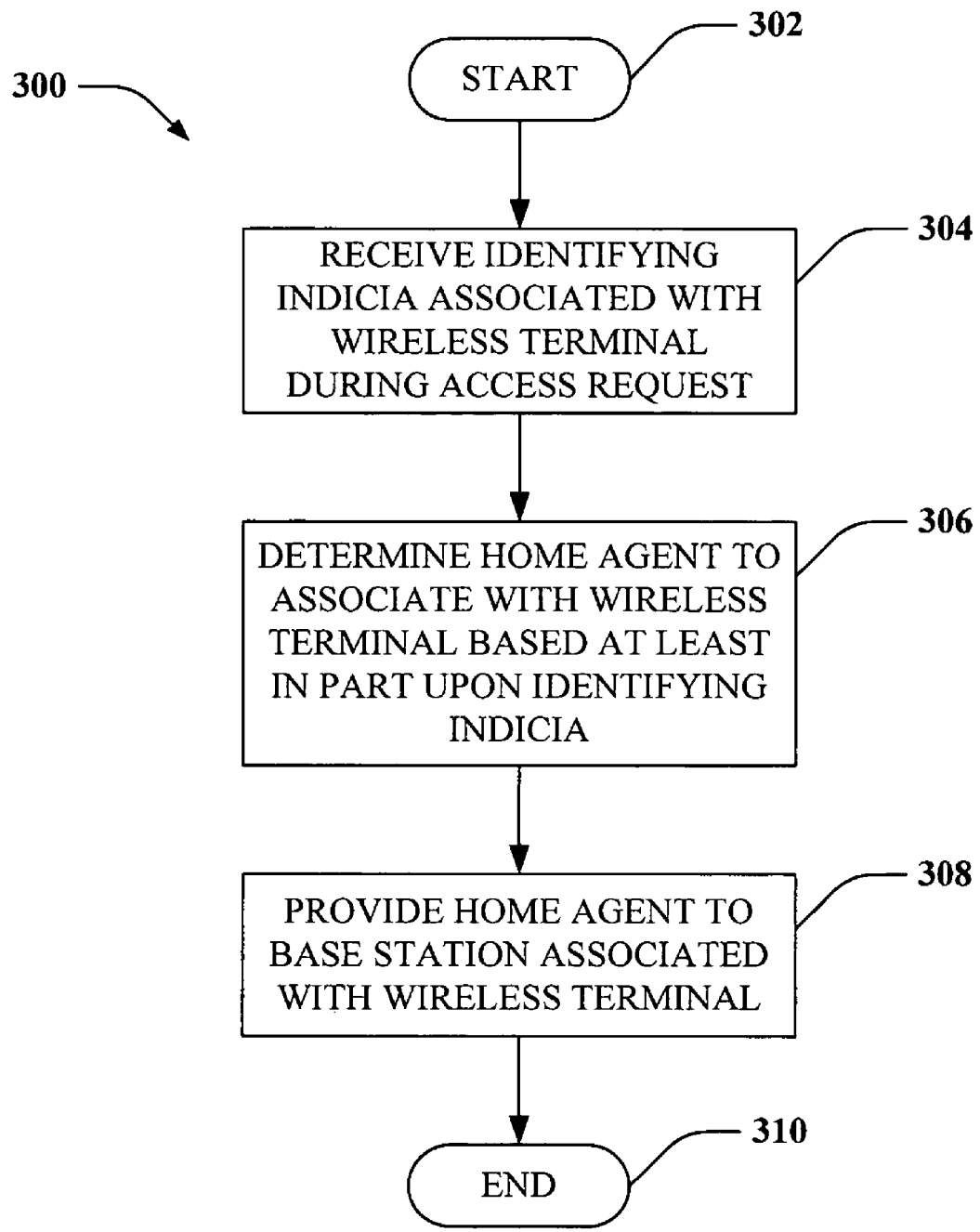
FIG. 3 is a representative flow diagram illustrating a methodology for identifying a home agent to associate with a wireless terminal.
Figure 4:
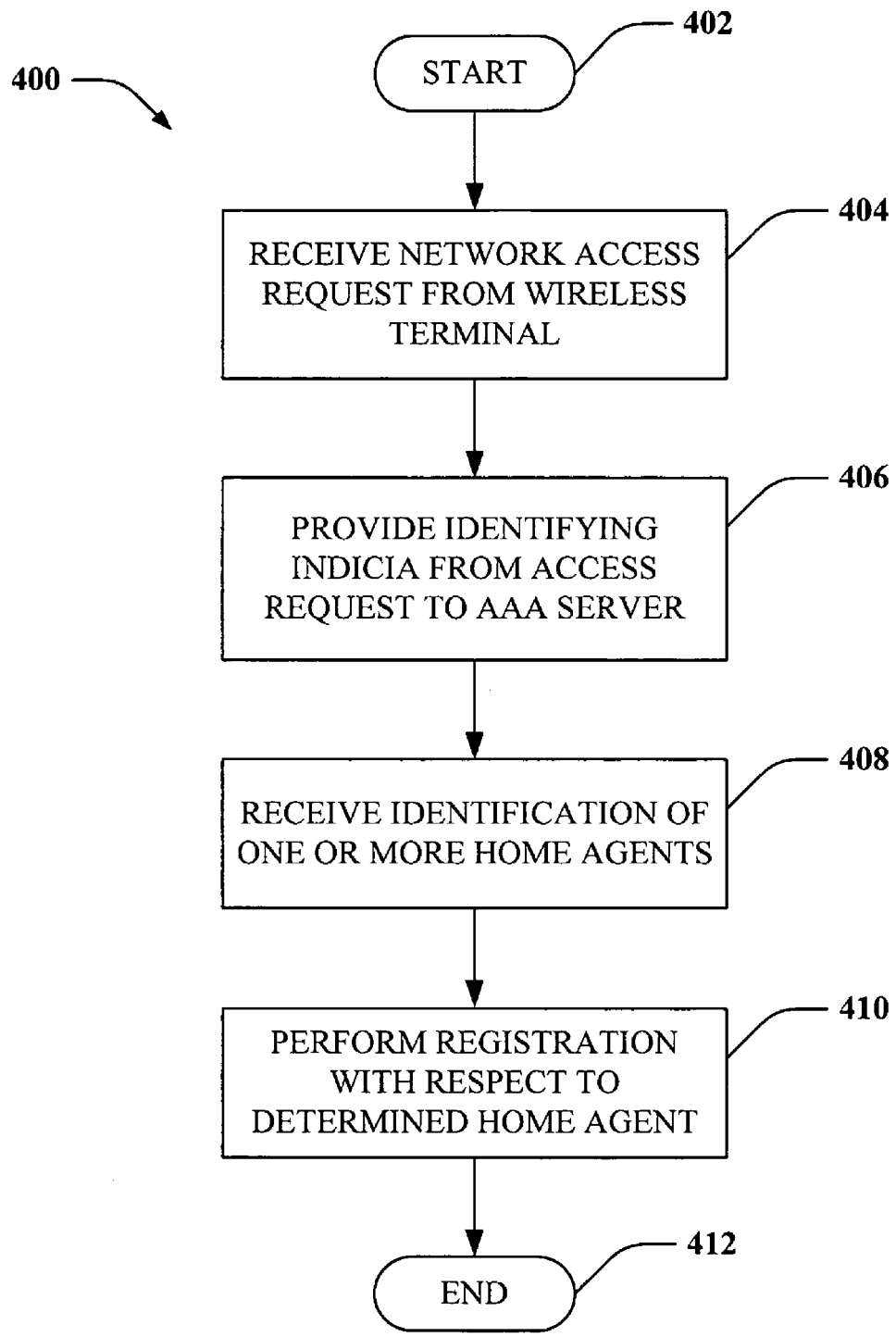
FIG. 4 is a representative flow diagram illustrating a methodology for performing registration of a wireless terminal with respect to an identified home agent.

Referring to FIGS. 3 and 4, methodologies relating to configuring a wireless terminal and/or a host are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Referring specifically to FIG. 3, a methodology 300 for providing a home agent identity/address to a base station associated with a wireless terminal is illustrated. Methodology 300 starts at 302, and at 304 identifying indicia associated with a wireless terminal is received. More particularly, such identifying indicia can be received in connection with an authentication/authorization/accounting procedure that is undertaken when the wireless terminal attempts to access a wireless network. Furthermore, the identifying indicia can be an NAI, and can be received at a AAA server, for example. At 306, a home agent that is desirably assigned to the wireless terminal is determined, wherein such determination can be based at least in part upon the identifying indicia. For instance, a database can be accessed to determine the home agent. In another example, a realm within the NAI can be analyzed to determine a particular network, such as an MVNO, and based upon such determination a home agent associated with the network can be determined. At 308, a home agent address/identity is provided to the base station that is communicatively coupled to the wireless terminal. Thereafter, the base station can resolve the home agent address (if necessary) and can create a Mobile IP tunnel to the correct home agent. Methodology 300 can be effectuated within a AAA server, for example, and can be undertaken within an IP-based cellular type system. The methodology 300 then completes at 310.

With reference now to FIG. 4, a methodology 400 for registering a wireless terminal with a home agent is illustrated. Methodology 400 can be undertaken within a base station, for example. Methodology 400 starts at 402, and at 404 a network access request is received from a wireless terminal. For instance, the wireless terminal can enter a geographic region associated with a network, can be powered on, etc. The access request can include providing a base station with identifying indicia associated with a wireless terminal (such that the wireless terminal can be subject to authentication/authorization). At 406, identifying indicia within the access request is provided to a AAA server, wherein such server can be an MVNO-specific AAA server, a wholesale AAA server, etc. As described above, the identifying indicia can be an NAI, an IMSI value, a phone number, or any other suitable data that can be utilized to identify the wireless terminal or a subscriber associated therewith.

At 408, identification of one or more home agents that may be assigned to the wireless terminal is received. For instance, such identification can be determined at a AAA server and provided to base station, wherein the identification may be IP address(es), hostname(s), etc. If one or more hostnames are received, then such hostnames can be resolved to IP addresses through utilization of a DNS, for example. At 410, registration is performed with respect to one of the identified home agents. For instance, the AAA server can provide base station with a realm or a list of home agents, and the base station can resolve the appropriate home agent based upon such list. In another example, the AAA server can provide the base station with a weighted list of home agents, wherein home agents can be weighted based upon location, capacity, and/or the like. The base station can then resolve which home agent should be associated with wireless terminal during registration with such terminal. In more detail, base station can create a Mobile IP (MIP) tunnel with the selected home agent. Methodology 400 then completes at 412.

Figure 5:
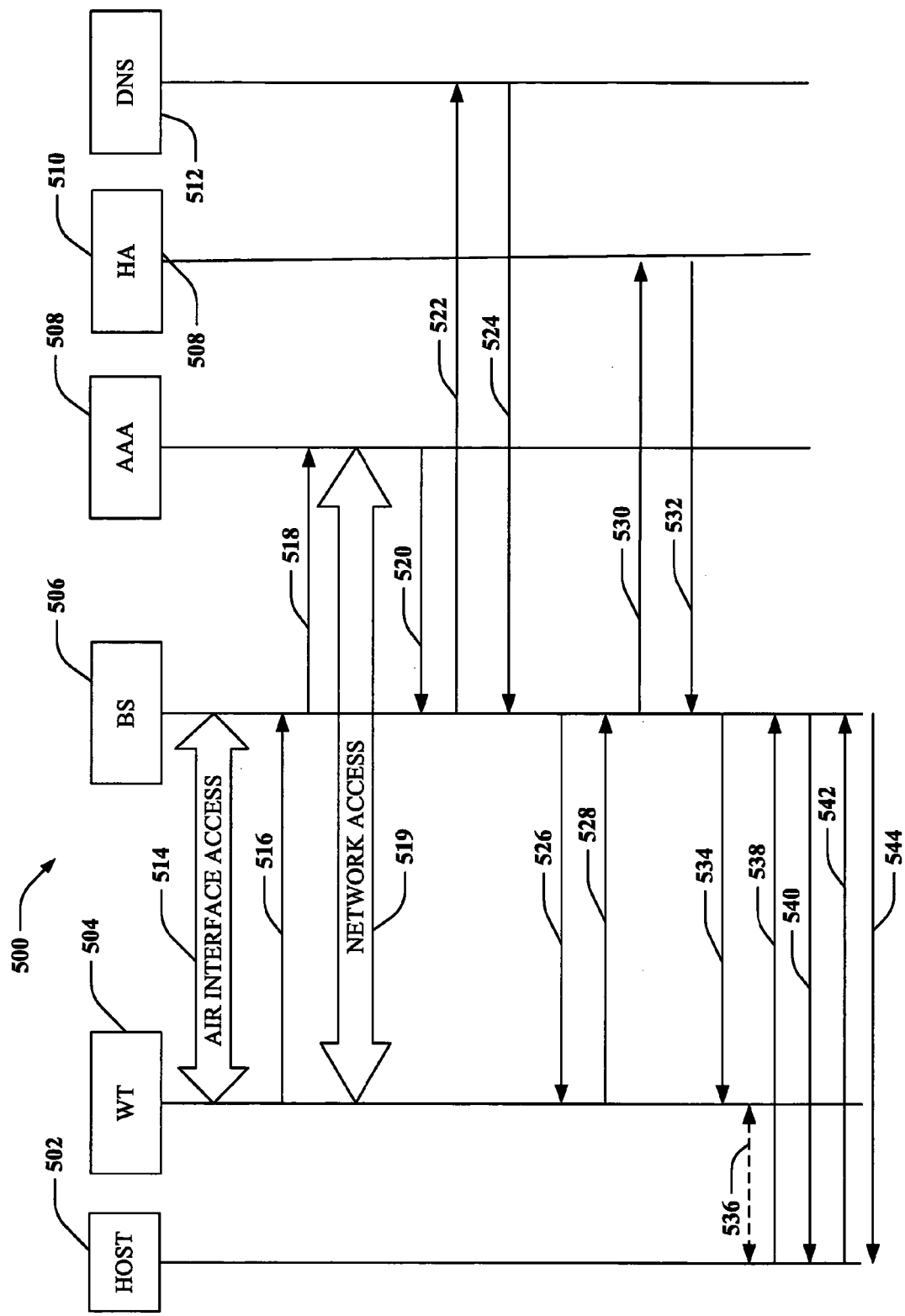
FIG. 5 is an example configuration diagram.

With reference to FIG. 5, a configuration diagram 500 is illustrated. Diagram 500 relates to a host 502, a wireless terminal 504, a base station 506, a AAA server 508, a home agent 510, and optionally a DNS 512. Host 502 can be a computer or a portable device, and can include an IP stack. Wireless terminal 504 can be utilized to handle physical layer connections and communications with a network (e.g., establish wireless communications with base station 506). Base station 506 acts as an access point to network services, and home agent 508 can be utilized in connection with mobility management. AAA server 508 can be utilized in connection with authentication, authorization, and/or accounting with respect to wireless terminal 504, and DNS 512 can be employed in connection with resolving an IP address when given a hostname of a home agent, for instance.

Wireless terminal 504 and base station 506 can undertake an air interface access at 514, wherein such act 514 relates to establishing a physical layer connection between wireless terminal 504 and base station 506. At 516 wireless terminal 504 provides base station 506 with a network access request, wherein such request can include identifying indicia relating to wireless terminal 504. Such indicia can include, for example, an NAI (or other suitable identifier). At 518, a AAA access request can be formed at base station 506 and provided to AAA server 508, wherein such request can include the NAI or other suitable identifier. At 519, network access can be performed between wireless terminal 504, base station 506, and AAA server 508. For instance, network access can relate to mutual authentication between wireless terminal 504 and AAA server. At 520, AAA server 508 can accept the access request and provide a message to base station 506 indicating as much. Additionally, the access accept message can include a home agent IP address, a hostname (e.g., MVNO-home agent hostname), or other suitable identifier of a particular home agent (e.g., home agent 510).

If AAA server 508 provides base station 506 with a hostname, base station 506 can provide a DNS resolution request with respect to such hostname to DNS 512 at 522. At 524 DNS 512 provides a resolution response to base station 506, wherein the resolution response can include an IP address of home agent 510 (that is associated with the hostname).

At 526, a connect response message is provided from base station 506 to wireless terminal 504, wherein such message can be employed in connection with configuring wireless terminal 504. For instance, the connect response message can include information that identifies base station 506 at a network layer (e.g., a unique identifier at the network layer). In an example, the information can be or include an IP address associated with base station 506, an indication that an IP address is ready with respect to host 502, the IP address of home agent 510, etc.

Wireless terminal 504 can thereafter provide a registration request message to base station 506 at 528, wherein the registration request message can conform to MMP (a protocol that is based upon Mobile IP but uses smaller messages). The act at 528 establishes a link as a primary link between wireless terminal 504 and base station 506 (if multiple links are enabled). In this example configuration diagram 500, MMP can run in wireless terminal 504 and base station 506. It is understood, however, that host 502 and/or home agent 510 can be configured to run MMP. Moreover, MIP can be run between wireless terminal 502 and base station 506 as is conventional, wherein such configuration request message includes a home agent identity or access. Base station 506 is configured to receive the registration request message and analyze a profile associated with the wireless terminal 504 (or subscriber associated therewith). The profile can be received, for instance, within the access message at 520 and can include the home agent address. Contents of the profile can be indicative of whether wireless terminal 504 is statically or dynamically addressed. At 530, base station 506 can form and relay a MIP registration request message to home agent 510, which was identified during act 520. Additionally, if an initial registration, an indication can be provided at 530 that there is no IP address assigned to wireless terminal 504 (e.g., by setting a flag or including a particular value within the request).

At 532 home agent 510 can respond to base station 506 with an appropriate reply in MIP (a MIP registration response message), for example. Such reply can include an IP address that is desirably assigned to host 502, an address of home agent 510, and/or an amount of time that the registration will be effective prior to expiring. Upon receiving the MIP registration response message, base station 506 can form an MMP registration response message and provide such message to wireless terminal 504 at 534. Such a message can include a lifetime field that corresponds to the amount of time within the MIP registration response message. For instance, the lifetime field can include a time that is equal to or less than the time indicated within the MIP registration response message. Alternatively, MIP can be run between home agent 510 and host 502 in connection with configuring the host 502 and/or wireless terminal 504.

Upon receipt of the MMP registration response message, wireless terminal 504 can have established its link with base station 506 as a primary link. As this may be a first time that wireless terminal 504 has established a primary link, wireless terminal 504 can indicate to host 502 over a wireless terminal interface that the network is available at 536. Such trigger can initiate an autoconfiguration process in host 502, wherein the configuration is valid until wireless terminal 504 indicates that the network is down over the wireless terminal interface. Typically, host 502 need only be notified once that a primary link has been established. In parallel, base station 506 can be aware that the link with wireless terminal 504 is the primary link with respect to wireless terminal 504.

At 538, host 502 can generate a DHCP discover message, which can be delivered to wireless terminal 504 and/or base station 506. If the DHCP discover message is received by base station 506, base station 506 can respond with an appropriate DHCP offer message to host 502 at 540. Such message can include various parameters (depending upon parameters within the DHCP Discover message). For instance, the DHCP offer message can include an IP address, a lease time, a gateway address for the assigned IP address, a network mast for the IP address assigned, and the like. At 542, host 502 can respond with a DHCP request message, and at 544 base station 506 can in turn respond with an acknowledgement message. In other words, base station 506 can be configured as a DHCP server. Host 502 is thus network layer connected and configured.

In another example, wireless terminal 504 can be configured as a DHCP server. For instance, the DHCP discover message can be received by wireless terminal 504, which can have knowledge of configuration information associated with host 502. Wireless terminal 504 can thereafter form and provide host 1002 with the DHCP offer message, and can receive a response of host 502 (e.g., in the form of a DHCP request message). Wireless terminal 504 can thereafter provide host 502 with a DHCP acknowledgement. Additionally, host 502 can be configured to run MMP, such that (rather than wireless terminal 504) host 502 can generate and receive MMP messages. If host 502 is configured in such a manner, it may not be necessary to configure wireless terminal 504 or base station 506 as a DHCP server, as host 502 can be configured directly over MMP.

Figure 6:
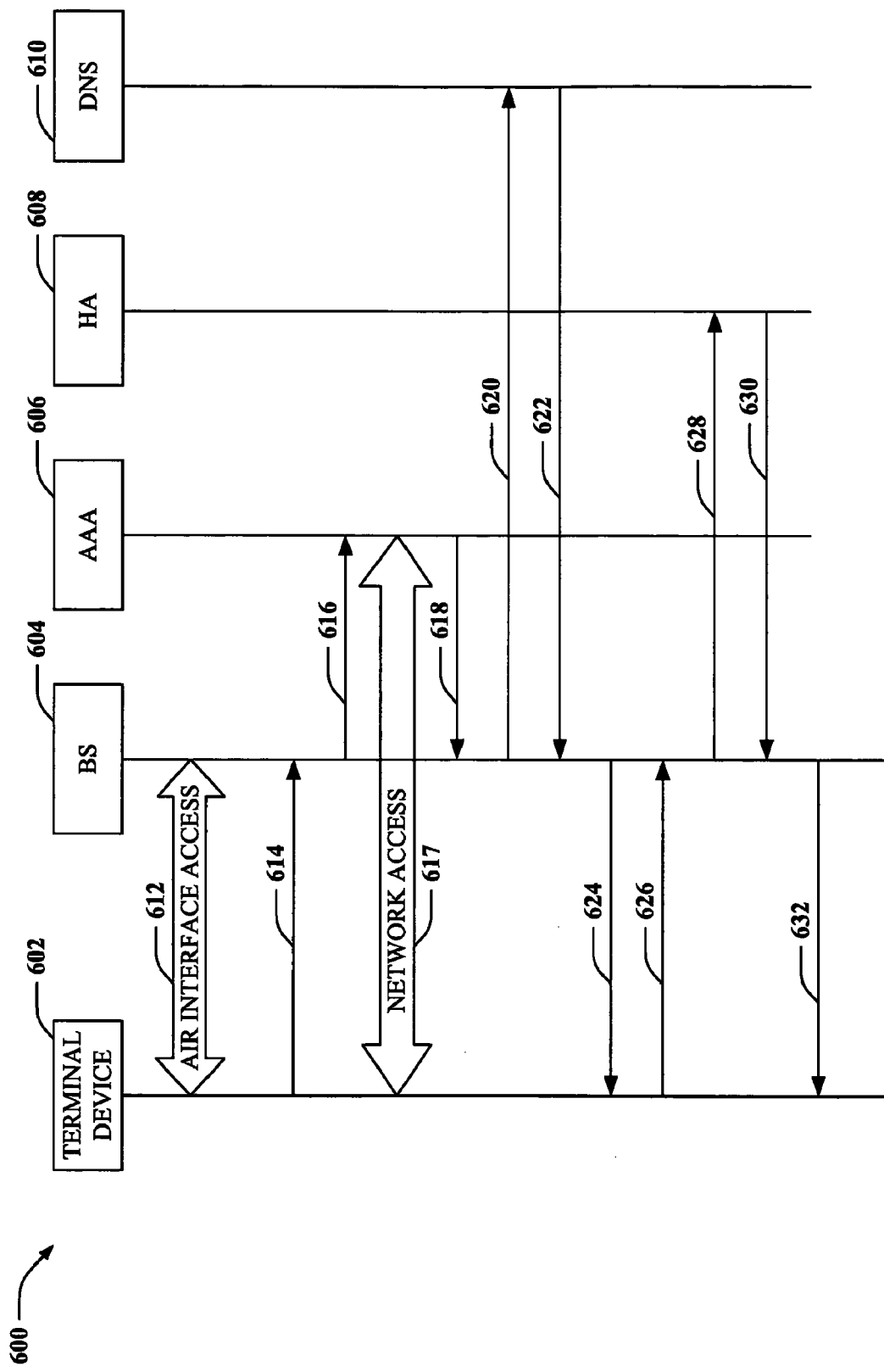
FIG. 6 is an example configuration diagram.

With reference now to FIG. 6, a configuration diagram 600 is illustrated. The configuration diagram 600 relates to a terminal device 602, a base station 604, a AAA server 606, a home agent 608, and (optionally) a DNS 610. For instance, terminal device 602 can be a wireless terminal. In another instance, terminal device 602 can be a wireless terminal integrated with a host (e.g., a computer, a Personal Digital Assistant (PDA), a game machine, a camera . . . ). Terminal device 602 and base station 604 can undertake an air interface access at 612, wherein such act 612 relates to establishing a physical layer connection between terminal device 602 and base station 604. At 614 terminal device 602 can form and relay a network access request to base station 604, wherein the request can include an NAI associated with terminal device 602 or other suitable identifying indicia.

At 616, base station 604 can provide AAA server 606 with a AAA access request. The request provided at 616 can include, for example, the identifying indicia. At 617, a network access procedure can be performed between terminal device 602 and AAA server 606. For example, AAA server can determine a profile associated with terminal device 602 during the network access procedure. At 618, AAA server 606 can generate an access accept message and provide such message to base station 604, wherein the access request message can include an address of home agent 608 (chosen from several available home agents) and/or a hostname, such as an MVNO home agent hostname. For instance, it may be desirable to assign terminal device 602 with a particular home agent that is associated with an MVNO that provides services to terminal device 602.

At 620, if the access accept message include a hostname, base station 604 can provide a DNS resolution request with respect to such host name to DNS 610. At 622, DNS 610 generates and transmits a resolution response message to base station 604, wherein the response message can include an IP address of home agent 608. Base station 604 can then provide a configuration message to terminal device 602 at 624, wherein such message can include an address of home agent 608. At 626, terminal device can form a registration request in Mobile IP (MIP). For instance, the registration request can relate to requesting an IP address for a host (not shown) associated with terminal device 602. At 628, base station 604 can transmit the MIP registration request to home agent 608, and at 630 home agent 608 can respond with a MIP registration response message. At 632, the MIP registration response message is relayed from base station 604 to terminal device 602. In this case the MIP registration response message can include additional configuration e.g., home address, network mask, default router, DNS server and other information normally included in DHCP messages (e.g., as in FIG. 5)

Figure 7:
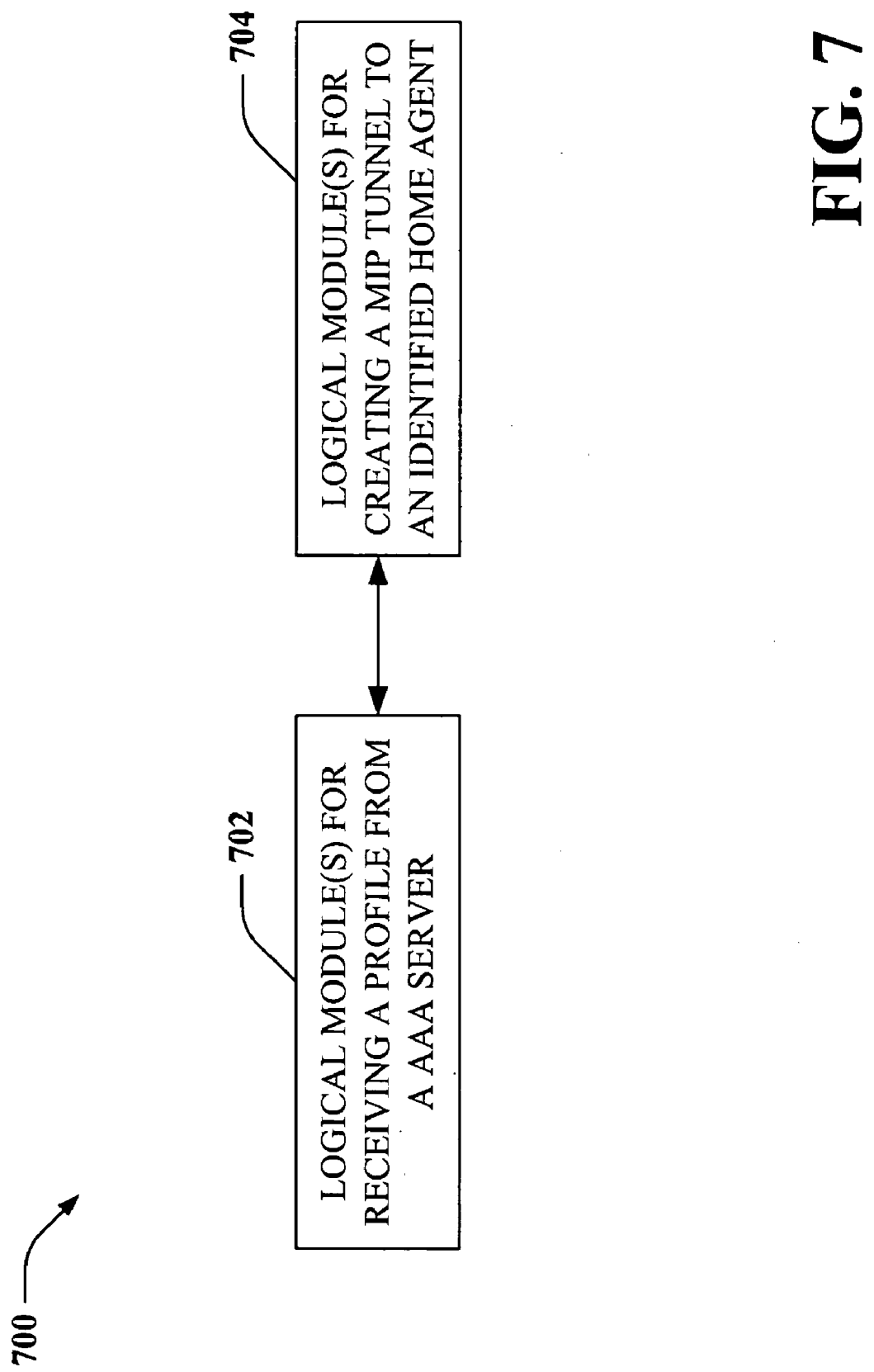
FIG. 7 is a block diagram of a system for identifying a home agent to associate with a wireless terminal.
Figure 8:
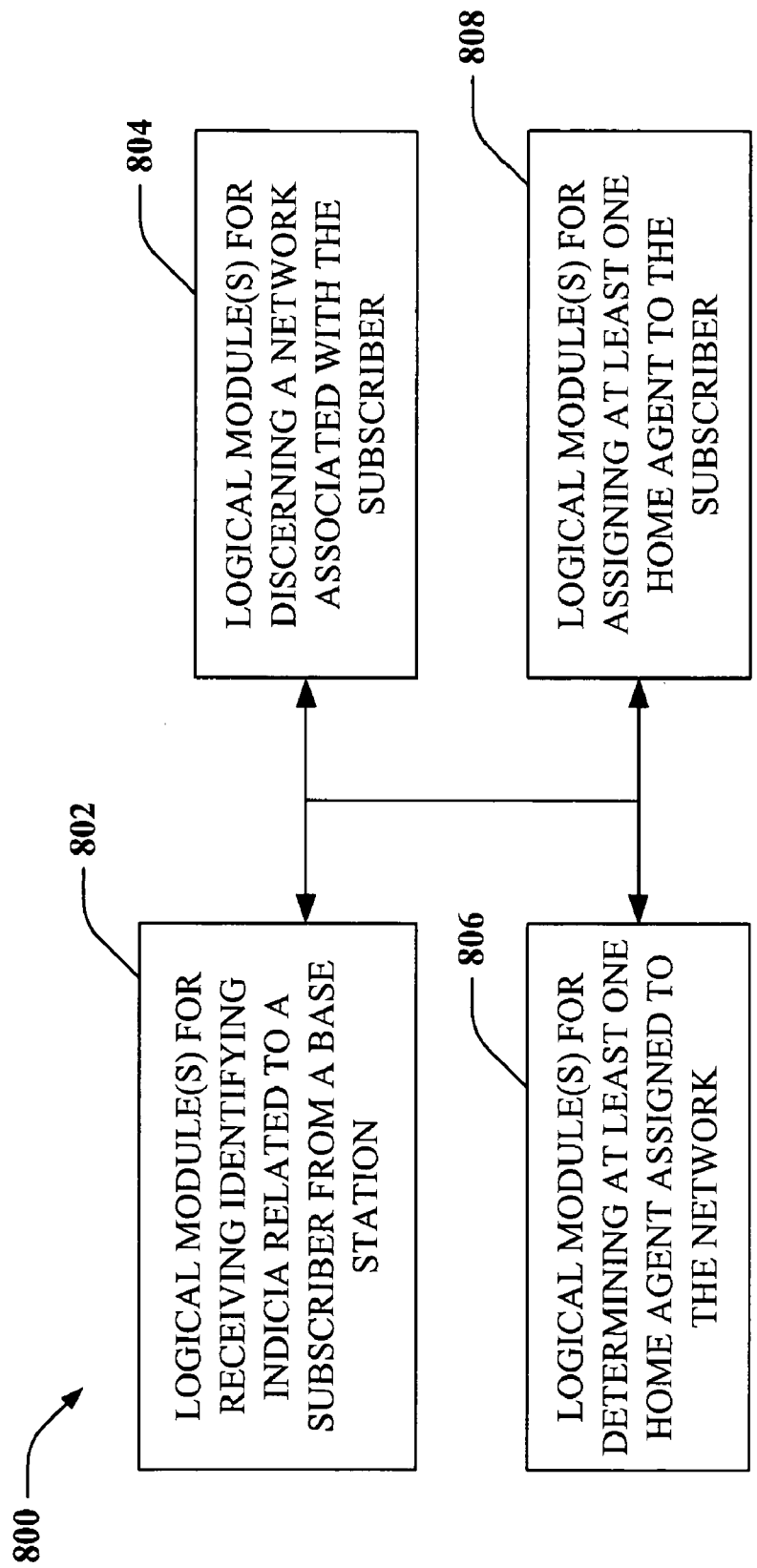
FIG. 8 is a block diagram of a system for performing registration of a wireless terminal with respect to an identified home agent.

Turning now to FIGS. 7 and 8 collectively, systems are provided that relate to configuring a host. The systems are represented as a series of interrelated functional blocks, which can represent functions implemented by a processor, software, hardware, firmware, or any suitable combination thereof. Referring specifically to FIG. 7, a system that facilitates association of mobile terminal with a home agent is illustrated. System 700 includes logical module(s) for receiving a profile from a AAA server 702. For example, the profile can be received in response to the AAA server receiving identifying indicia associated with a mobile terminal. The logical module(s) 702 can include an antenna, a receiver chain, a network port, and/or any suitable hardware, software, firmware, and the like that can facilitate receipt of the profile from the AAA server. System 700 additionally includes logical module(s) for creating a MIP tunnel to an identified home agent 704. For example, the home agent can be identified within the received profile. The logical module(s) 704 can include an antenna, a transmitter chain, a processor, memory, hardware, software, firmware, etc.

With respect to FIG. 8, a system 800 utilized in connection with registering a wireless terminal with a selected home agent is illustrated. System 800 includes logical module(s) for receiving identifying indicia related to a subscriber from a base station 802. For instance, the identifying indicia can be a NAI or other suitable identifying data. The module(s) 802 can include an antenna, a receiver chain, a processor, memory, and/or any suitable hardware, software, and/or firmware that can be utilized in connection with receiving the identifying indicia. System 800 also includes logical module(s) for discerning a network associated with the subscriber 804. For example, the discernment can be made based at least in part upon the identifying indicia. Such module(s) 804 can include a processor, a database, etc. System 800 can further include logical module(s) for determining at least one home agent assigned to the network 806, wherein the module(s) 806 can include a processor, memory, a database, a DNS, etc. System 800 can further include logical module(s) for assigning at least one home agent to the describer 808, wherein module(s) 808 can include an antenna, a transmitter, a transmitter chain, a network port, a processor, memory, and the like.

Figure 9:
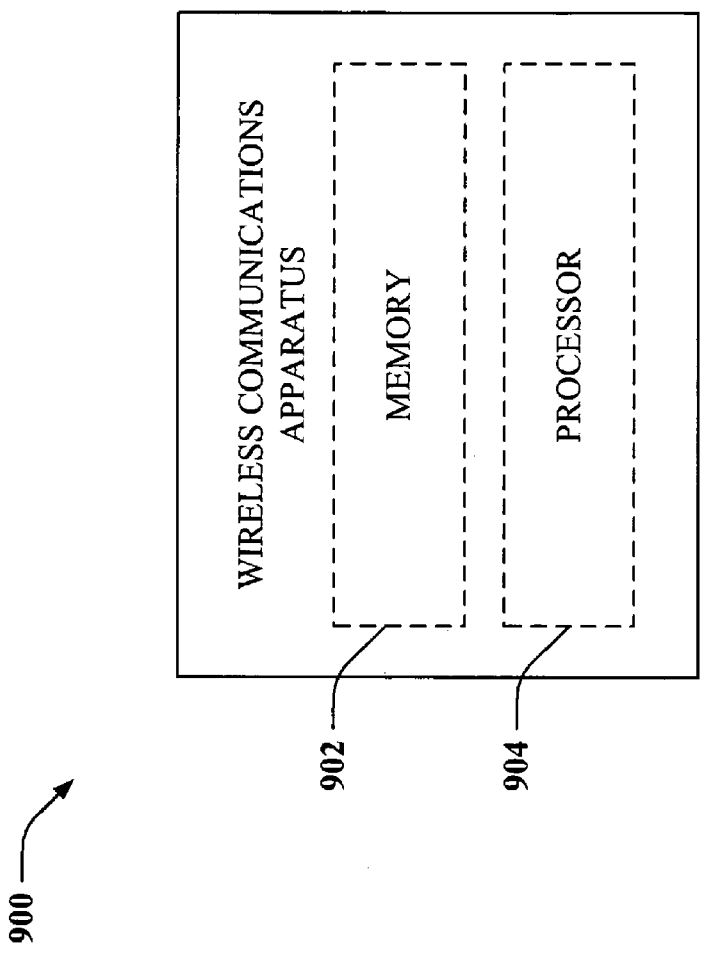
FIG. 9 illustrates an example wireless communications apparatus.

Now turning to FIG. 9, a wireless communications apparatus 900 is illustrated. Wireless communications apparatus can be, for example, a wireless terminal, a base station, and/or a AAA server. Apparatus 900 can include a memory 902, which can include instructions that relate to, for example, creating, packaging, and/or receiving identifying indicia associated with a subscriber. Moreover, memory 902 can include instructions for selecting a home agent based at least in part upon a received subscriber identity. Additionally, memory 902 can include instructions for creating an MIP tunnel between a base station and a selected home agent, etc. Apparatus 900 can also include a processor 904 that can execute instructions retained within memory 902.

Figure 10:
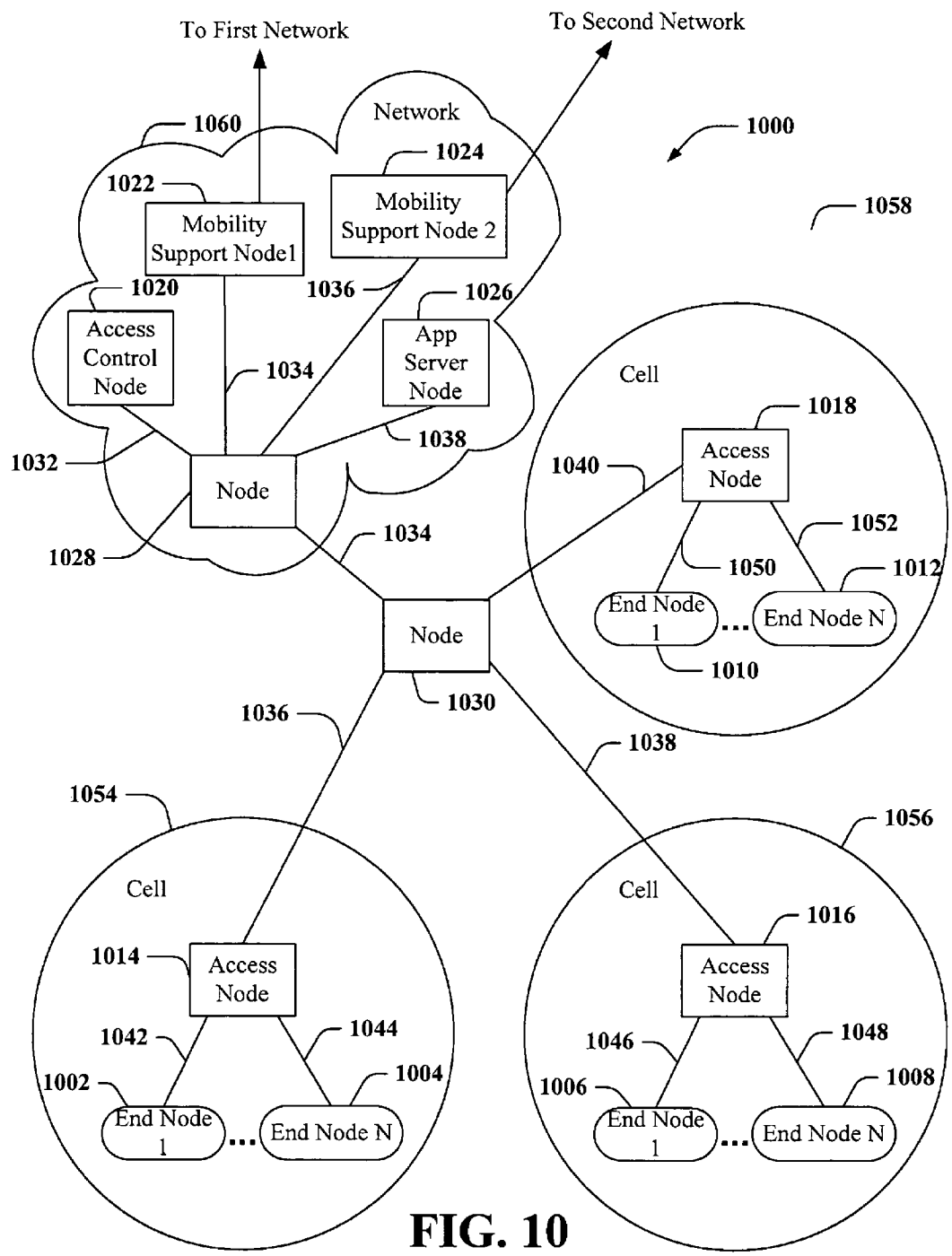
FIG. 10 illustrates an example communications system.

To provide additional context for one or more embodiments described herein, FIG. 10 is provided to illustrate an example communication system 1000 that comprises a plurality of nodes interconnected by communications links. The system 1000 may use Orthogonal Frequency Division Multiplexing (OFDM) signals to communicate information over wireless links. However, other types of signals, e.g., Code Division Multiple Access (CDMA) signals or Time Division Multiple Access (TDMA) signals, are also contemplated (together with signals utilized in land-based networks). Nodes in the communication system 1000 exchange information using signals, e.g., messages, based on communication protocols, e.g., the Internet Protocol (IP). The communications links of the system 1000 may be implemented, for example, using wires, fiber optic cables, and/or wireless communications techniques. The system 1000 includes a plurality of end nodes 1002-1012, which access the communication system 1000 by way of a plurality of access nodes 1014-1018. End nodes 1002-1012 may be, e.g., wireless communication devices or terminals, and the access nodes 1014-1018 may be, e.g., wireless access routers or base stations. Communication system 1000 also includes a number of other nodes 1020-1030 that are used to provide interconnectivity or to provide specific services or functions.

Communications system 1000 depicts a network 1060 that includes access control node 1020 (which can be a AAA server), first mobility support node 1022, a second mobility support node 1024, and application server node 1026 (which can be a DNS server, for instance), all of which are connected to an intermediate network node 1028 by a corresponding network link 1032-1038, respectively. In some embodiments, the access control node, e.g., a Remote Authentication Dial In User Service (RADIUS) or Diameter server, supports authentication, authorization, and/or accounting of end nodes and/or services associated with end nodes. In some embodiments, mobility support nodes 1022 and 1024, e.g., a Mobile IP home agents and/or context transfer servers, support mobility, e.g., handoff, of end nodes between access nodes, e.g., by way of redirection of traffic to/from end nodes and/or transfer of state associated with end nodes between access nodes. In some embodiments, application server node 1026, e.g., a Session Initiation Protocol server, streaming media server, or other application layer server, supports session signaling for services available to end nodes and/or provides services or content available to end nodes. In an example, different end nodes can be associated with different mobility support nodes according to a network to which they belong. For instance, first mobility support node 1022 can be associated with a first network while second mobility support node 1024 can be connected to a second network. Such networks can be, for instance, MVNOs, VPNs, and/or a combination thereof. As an example, mobility support nodes 1022 and 1024 can be coupled to network gateway modules (not shown) that enable such nodes to couple to first and second networks, respectively.

Intermediate network node 1028 in network 1060 provides interconnectivity to network nodes that are external from the perspective of network 1060 by way of network link 1034. Network link 1034 is connected to intermediate network node 1030, which provides further connectivity to access nodes 1014, 1016, and 1018 by way of network links 1036-1040, respectively. Each access node 1014-1018 is depicted as providing connectivity to end nodes 1002-1012, respectively, by way of corresponding access links 1042-1052, respectively. In communication system 1000, each access node 1014-1018 is depicted as using wireless technology, e.g., wireless access links, to provide access. Wired technology may also be utilized, however, in connection with provision of access. A radio coverage area, e.g., communications cells 1054-1058 of each access node 1014-1018, is illustrated as a circle surrounding the corresponding access node.

Communication system 1000 can be used as a basis for the description of various embodiments described herein. Alternative embodiments include various network topologies, where a number and type of nodes (including network nodes, access nodes, end nodes, as well as various control, support, and server nodes), a number and type of links, and interconnectivity between various nodes may differ from that of communication system 1000. Additionally, some of the functional entities depicted in communication system 1000 may be omitted or combined. Location or placement of these functional entities may also be varied.

Figure 11:
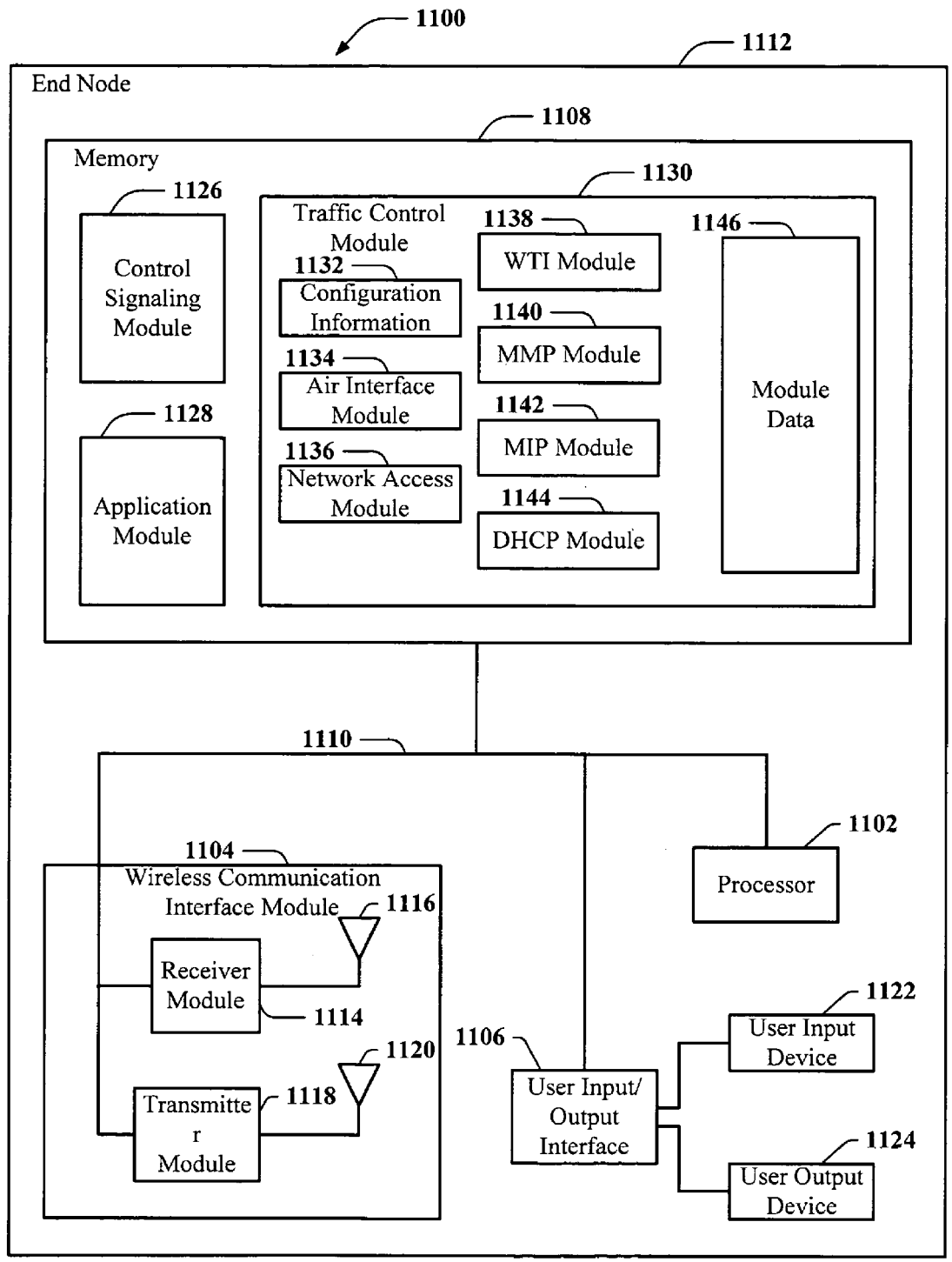
FIG. 11 illustrates an example end node.

FIG. 11 provides an illustration of an example end node 1100, e.g., wireless terminal, host device, or combination thereof. End node 1100 is a representation of an apparatus that may be used as any one of end nodes 1002-1012 (FIG. 10). End node 1100 includes a processor 1102, a wireless communication interface module 1104, a user input/output interface 1106 and memory 1108 coupled together by a bus 1110. Accordingly, by way of bus 1110, the various components of the end node 1100 can exchange information, signals and data. Components 1102-1108 of end node 1100 can be located inside a housing 1112.

Wireless communication interface module 1104 provides a mechanism by which the internal components of end node 1100 can send and receive signals to/from external devices and network nodes, e.g., access nodes. Wireless communication interface module 1104 includes, e.g., a receiver module 1114 with a corresponding receiving antenna 1116 and a transmitter module 1118 with a corresponding transmitting antenna 1120 used for coupling end node 1100 to other network nodes, e.g., by way of wireless communications channels.

End node 1100 also includes a user input device 1122, e.g., keypad, and a user output device 1124, e.g., display, which are coupled to bus 1110 through user input/output interface 1106. Thus, user input/output devices 1122 and 1124 can exchange information, signals and data with other components of end node 1100 by way of user input/output interface 1106 and bus 1110. User input/output interface 1106 and associated devices 1122 and 1124 provide mechanisms by which a user can operate end node 1100 to accomplish various tasks. In particular, user input device 1122 and user output device 1124 provide functionality that allows a user to control end node 1100 and applications, e.g., modules, programs, routines and/or functions, that execute in memory 1108 of end node 1100.

Processor 1102, under control of various modules, e.g., routines, included in memory 1108 controls operation of end node 1100 to perform various signaling and processing. The modules included in memory 1108 are executed on startup or as called by other modules. Modules may exchange data, information, and signals when executed. Modules may also share data and information when executed. Memory 1108 of end node 1100 includes a control signaling module 1126, an application module 1128, and a traffic control module 1130, which further includes configuration information 1132 and various additional modules.

Control signaling module 1126 controls processing relating to receiving and sending signals, e.g., messages, for controlling operation and/or configuration of various aspects of end node 1100 including, e.g., traffic control module 1130 as well as configuration information 1132 and various additional modules. In some embodiments, control signaling module 1126 can include state information, e.g., parameters, status and/or other information, relating to operation of end node 1100 and/or one or more signaling protocols supported by control signaling module 1126. In particular, control signaling module 1126 may include configuration information, e.g., end node identification information and/or parameter settings, and operational information, e.g., information about current processing state, status of pending message transactions, etc.

Application module 1128 controls processing and communications relating to one or more applications supported by end node 1100. In some embodiments, application module 1128 processing can include tasks relating to input/output of information by way of the user input/output interface 1106, manipulation of information associated with an application, and/or receiving or sending signals, e.g., messages, associated with an application. In some embodiments, application module 1128 includes state information, e.g., parameters, status and/or other information, relating to operation of one or more applications supported by application module 1128. In particular, application module 1128 may include configuration information, e.g., user identification information and/or parameter settings, and operational information, e.g., information about current processing state, status of pending responses, etc. Applications supported by application module 1128 include, e.g., Voice over IP (VoIP), web browsing, streaming audio/video, instant messaging, file sharing, gaming, etc.

Traffic control module 1130 controls processing relating to receiving and sending data information, e.g., messages, packets, and/or frames, through wireless communication interface module 1104. The example traffic control module 1130 includes configuration information 1132 as well as various additional modules that enable a home agent to be selected from amongst a plurality of home agents. Various additional modules are included, in some embodiments, to perform particular functions and operations as needed to support specific aspects of traffic control. Modules may be omitted and/or combined as needed depending on the functional requirements of traffic control. A description of each additional module included in traffic control module 1130 follows.

An air interface module 1134 facilitates establishing a physical layer connection between end node 1100 and an access node (not shown, such as a base station. Air interface module 1134 can be initiated, for instance, upon end node 1100 receiving power and/or entering a network (e.g., entering a geographic area associated with a network). Configuration information 1132 can include configuration information, e.g., parameters settings, that affect the operation of air interface module 1134.

A network access module 1136 can facilitate request of network access to a AAA server, for example, and receipt of a response relating to network access. For example, network access module 1136 can be employed in connection with providing identifying indicia associated with end node 1100 to a AAA server, such as an NAI. The identifying indicia can be retained within module data 1146, which can be read and/or written to by network access module. Network access module 1136 can also be utilized to receive an address of a home agent that is to be associated with end node 1100 (e.g., a home agent related to an MVNO that provides services to end node 1100).

A WTI module 1138 can be utilized to pass data between a wireless terminal and a host. Such information can be configuration information, such as an IP address assigned to a host (and other suitable configuration information). An MMP module 1140 enables end node 1100 to receive and interpret messages that correspond to an MMP protocol (for example, from a base station). MMP module additionally allows end node 1100 to form and transmit MMP messages, such as configuration request messages, to a base station. An MIP module 1142 provides a manner for end node 1100 to receive, interpret, form, and transmit configuration messages in Mobile IP (e.g., Mobile IPv4 and/or Mobile IPv6). A DHCP module 1144 provides end node 1100 with an ability to act as a DHCP server. For instance, DHCP module 1144 can be configured to respond to a DHCP discover message, provide a host device with configuration information, etc. Module data 1146 can include data that can be extracted by one or modules 1132-1144 or data that is input by one or more modules 1132-1144. For instance, module data 1146 can include network access data, can retain particular addresses (e.g., base station addresses, home agent addresses, . . . ), MMP or Mobile IP data, etc.

Figure 12:
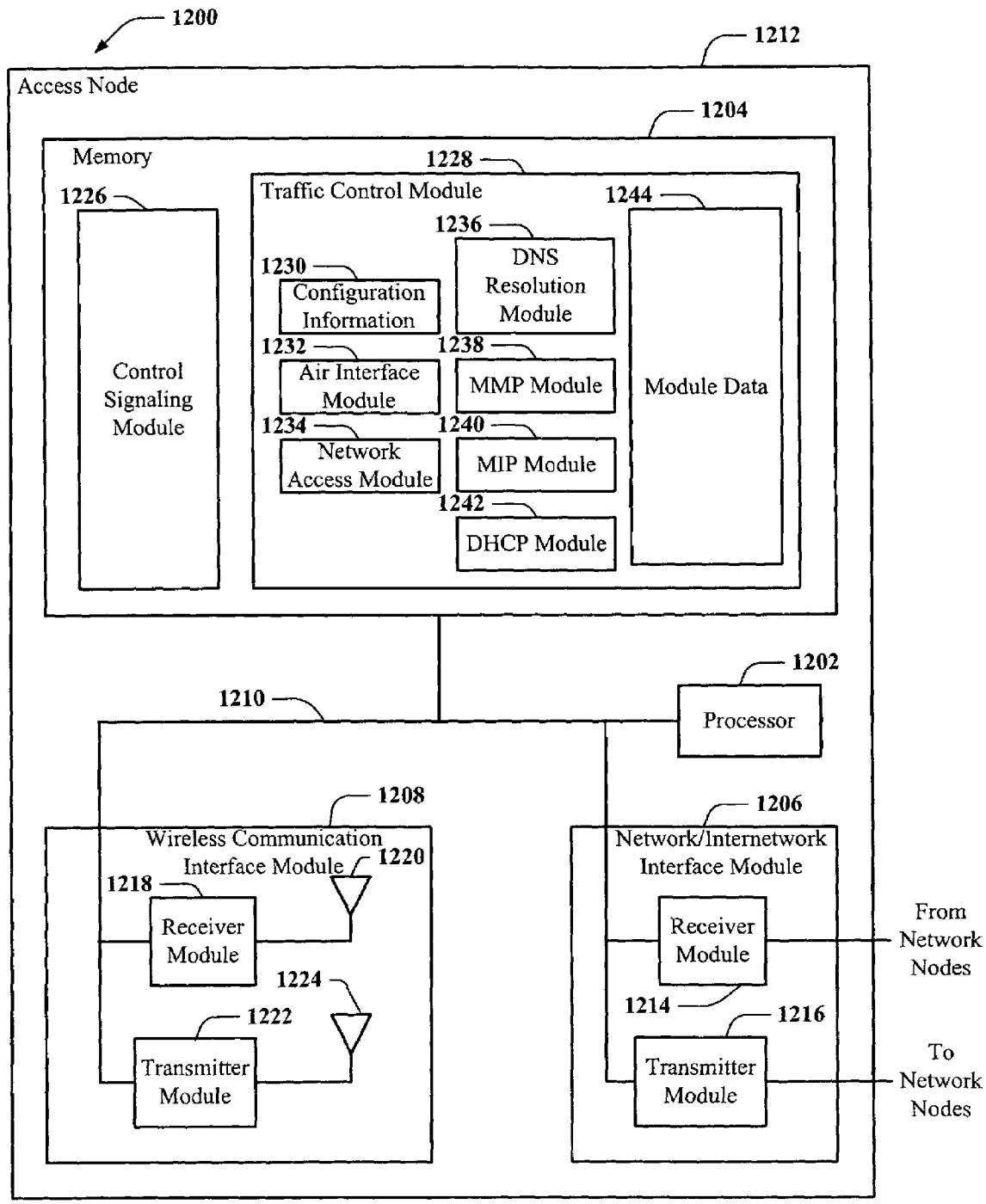
FIG. 12 illustrates an example access node.

FIG. 12 provides a detailed illustration of an example access node 1200. The access node 1200 is a detailed representation of an apparatus that may be used as any one of the access nodes 1014-1018 depicted in FIG. 10. In the FIG. 12 embodiment, access node 1200 includes a processor 1202, memory 1204, a network/internetwork interface module 1206 and a wireless communication interface module 1208, coupled together by bus 1210. Accordingly, by way of bus 1210 the various components of access node 1200 can exchange information, signals and data. The components 1202-1210 of access node 1200 are located inside a housing 1212.

Network/internetwork interface module 1206 provides a mechanism by which the internal components of access node 1200 can send and receive signals to/from external devices and network nodes. Network/internetwork interface module 1206 includes a receiver module 1214 and a transmitter module 1216 used for coupling node 1200 to other network nodes, e.g., through copper wires or fiber optic lines. Wireless communication interface module 1208 also provides a mechanism by which the internal components of access node 1200 can send and receive signals to/from external devices and network nodes, e.g., end nodes. Wireless communication interface module 1208 includes, e.g., a receiver module 1218 with a corresponding receiving antenna 1220 and a transmitter module 1222 with a corresponding transmitting antenna 1224. Wireless communication interface module 1208 is used for coupling access node 1200 to other nodes, e.g., by way of wireless communication channels.

Processor 1202 under control of various modules, e.g., routines, included in memory 1204 controls operation of access node 1200 to perform various signaling and processing. The modules included in memory 1204 are executed on startup or as called by other modules. Modules may exchange data, information, and signals when executed. Modules may also share data and information when executed. In the FIG. 12 embodiment, memory 1204 of access node 1200 includes a control signaling module 1226 and a traffic control module 1228, which further includes configuration information 1230 and various additional modules 1232-1242.

Control signaling module 1226 controls processing relating to receiving and sending signals, e.g., messages, for controlling operation and/or configuration of various aspects of access node 1200 including e.g., traffic control module 1228 as well as configuration information 1230 and the various additional modules included therein 1232-1242. For instance, control signaling module 1226 includes state information, e.g., parameters, status and/or other information, relating to operation of access node 1200 and/or one or more signaling protocols supported by control signaling module 1226. In particular, control signaling module 1226 may include configuration information, e.g., access node identification information and/or parameter settings, and operational information, e.g., information about current processing state, status of pending message transactions, etc.

Traffic control module 1228 controls processing relating to receiving and sending data information, e.g., messages, packets, and/or frames, by way of wireless communication interface module 1208. For instance, traffic control module can include configuration information 1230 as well as various additional modules 1232-1242 that are utilized in connection with determining a home agent to associated with an end node (such as end node 1600). In some embodiments, traffic control module 1228 includes state information, e.g., parameters, status and/or other information, relating to operation of access node 1200, traffic control module 1228, and/or one or more of the various additional modules included therein 1232-1242. Configuration information 1230, e.g., parameter settings, determines, affects and/or prescribes operation of traffic control module 1228 and/or the various additional modules included therein 1232-1242. The various additional modules are included, in some embodiments, to perform particular functions and operations as needed to support specific aspects of traffic control. In various embodiments, modules may be omitted and/or combined as needed depending on the functional requirements of home agent selection. A description of each additional module included in traffic control module 1228 follows.

Air interface module 1232 facilitates establishing a physical layer connection between an end node and access node 1200. Air interface module 1232 can be initiated, for instance, upon access node 1200 receiving an indication that a wireless terminal is within range of access node 1200 and desires access to a network. A network access module 1234 can be employed in connection with authenticating and authorizing an end node (e.g., authenticating identity of an end node and determining type and quality of service that should be provided to the end node). For instance, access node 1200 can act as a conduit between an end node and a AAA server, and network access module 1234 can facilitate packaging and relay of messages that relate to network access.

A DNS resolution module 1236 can be utilized in connection with receiving a hostname and resolving an IP address based at least in part upon the host name. In a particular example, access node 1200 can receive a MVNO-home agent hostname from a AAA server. DNS resolution module 1236 can provide a DNS resolution request to a DNS server and can receive an IP address from such server. DNS resolution module 1236 can thereafter store the IP address within module data 1244, for example.

An MMP module 1238 enables access node 1200 to receive and interpret messages that correspond to an MMP protocol (for example, from a wireless terminal). MMP module additionally allows access node 1200 to form and transmit MMP messages, such as configuration request messages, to an end node. An MIP module 1240 provides a manner for access node 1200 to receive, interpret, form, and transmit configuration messages in Mobile IP (e.g., Mobile IPv4 and/or Mobile IPv6). A DHCP module 1242 provides access node 1200 with an ability to act as a DHCP server. For instance, DHCP module 1242 can be configured to respond to a DHCP discover message, provide a host device with configuration information, etc. Module data 1244 can include data that can be extracted by one or modules 1232-1242 or data that is input by one or more modules 1232-1242. For instance, module data 1242 can include network access data, can retain particular addresses (e.g., base station addresses, home agent addresses, . . . ), MMP or Mobile IP data, etc. Additionally, module data 1242 can retain identifying indicia associated with an end node, a profile, a MVNO-home agent identifier, a home agent address, DHCP data, and the like.

Figure 13:
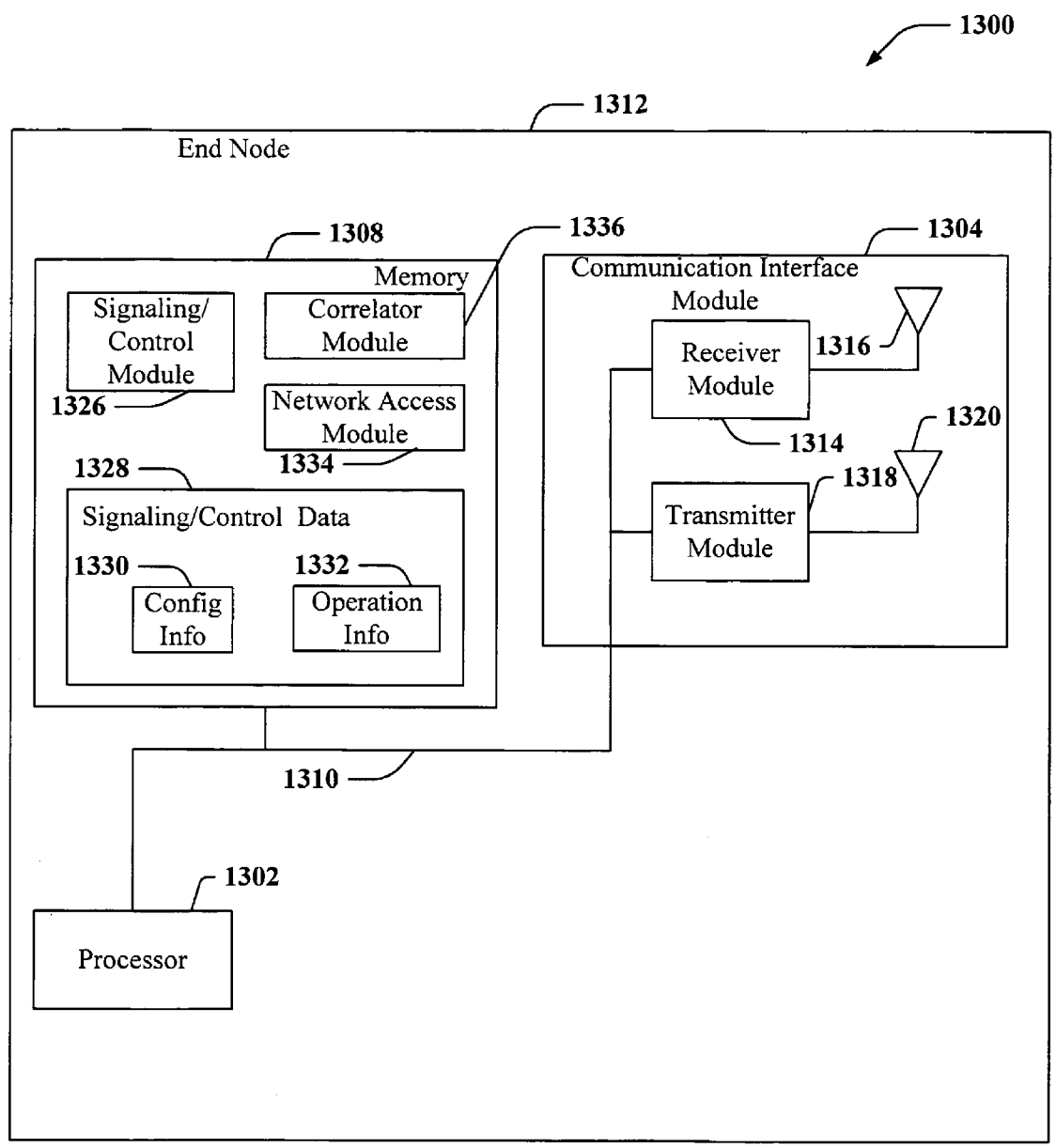
FIG. 13 illustrates an example AAA server.

FIG. 13 illustrates an example AAA server 1300 associated with various aspects. AAA server 1300 can be, for example, an access control node 1026 depicted in FIG. 10. As depicted, AAA server 1300 includes a processor 1302, a communication interface 1304, and memory 1308 coupled together by a bus 1310. Accordingly, various components of AAA server 1300 can exchange information, signals and data by way of bus 1310. Components 1302-1310 of end node 1300 may be located inside a housing 1312.

Communication interface 1304 provides a mechanism by which the internal components of AAA server 1300 can send and receive signals to/from external devices and network nodes (e.g., access nodes). Communication interface 1304 includes, for example, a receiver module 1314 with a corresponding receiving antenna 1316 and a transmitter module 1318 with a corresponding transmitting antenna 1320 used for coupling AAA server 1300 to other network nodes (e.g., by way of any suitable communications channels).

Processor 1302 may be under control of various modules (e.g., routines) included in memory 1308 and may control operation of AAA server 1300 to perform various signaling and processing as described herein. The modules included in memory 1308 can be executed on startup or as called by other modules. Modules may exchange data, information, and signals when executed. Modules may also share data and information when executed. Memory 1308 of AAA Server 1300 may include a signaling/control module 1326 and signaling/control data 1328.

Signaling/control module 1326 controls processing relating to receiving and sending signals (e.g., messages) for management of state information storage, retrieval, and processing. Signaling/control data 1328 includes state information such as, for instance, parameters, status, and/or other information relating to operation of the AAA server. In particular, signaling/control data 1328 may include configuration information 1330 (e.g., AAA server identification information) and operational information 1332 (e.g., information about current processing state, status of pending responses, etc.). Signaling/control module 1326 may access and/or modify signaling/control data 1328 (e.g., update configuration information 1330 and/or operational information 1332).

Memory 1308 can also include a correlator module 1334 which is utilized to correlate a home agent with a wireless terminal based upon identifying indicia associated with a wireless terminal, such as an NAI. For instance, correlator module 1334 can access a database that indexes home agents with particular MVNOs, and correlator module 1334 can determine a particular MVNO based upon the identifying indicia. Thereafter, correlator module 1334 can determine at least one home agent that is assigned to the particular MVNO. Memory 1308 can also include a network access module 1336 that can be utilized to perform authentication with respect to a particular wireless terminal (as well as authorization and accounting).

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for registering a wireless terminal with a home agent, comprising:
receiving identifying indicia associated with a subscriber from the wireless terminal when the wireless terminal requests access to a network;
providing the identifying indicia to an authentication server;
receiving, at a base station, a profile associated with the subscriber, wherein there are a plurality of home agents to which registration information from the wireless terminal could be routed, wherein the plurality of home agents are associated with different mobile virtual network operators, wherein the profile comprises a hostname of a home agent that is assigned to a mobile virtual network operator associated with the subscriber, and wherein the profile is received from the authentication server;
providing a resolution request with respect to the hostname from the base station to a domain name server; and
routing the registration information from the wireless terminal to an identified home agent, wherein routing registration information comprises receiving a registration request at the base station and transmitting the registration request from the base station to the identified home agent.

2. A base station configured to perform the method of claim 1.

3. The method of claim 1, further comprising creating a Mobile IP tunnel to the identified home agent.

4. The method of claim 1, wherein the identified home agent is determined through identifying the mobile virtual network operator associated with the identifying indicia provided to the authentication server.

5. The method of claim 1, wherein the identifying indicia are included in a network access request, wherein the resolution request is provided from the base station to the domain name server before the base station sends a response to the network access request to the wireless terminal, and wherein the registration request is received after the response to the network access request is sent to the wireless terminal.

6. The method of claim 1, further comprising:
receiving, at the base station, a list of a plurality of home agents sent by the authentication server; and
selecting, at the base station, one home agent from within the list of home agents and routing registration information to the selected home agent.

7. The method of claim 6, wherein the list is an ordered list.

8. The method of claim 1, further comprising registering the wireless terminal with the home agent through utilization of a micromobility protocol.

9. A base station, comprising:
a memory that retains instructions for:
receiving identifying indicia associated with a subscriber from a wireless terminal when the wireless terminal requests access to a network;
providing the identifying indicia to an authentication server;
receiving, at the base station, a profile associated with the subscriber, wherein there are a plurality of home agents to which registration information from the wireless terminal could be routed, wherein the plurality of home agents are associated with different mobile virtual network operators, wherein the profile comprises a hostname of a home agent that is assigned to a mobile virtual network operator associated with the subscriber, and wherein the profile is received from the authentication server;
providing a resolution request with respect to the hostname from the base station to a domain name server; and
routing the registration information from the wireless terminal to an identified home agent, wherein routing registration information comprises receiving a registration request at the base station and transmitting the registration request from the base station to the identified home agent; and
a processor that executes the instructions.

10. The base station of claim 9, wherein the authentication server is a mobile virtual network operator-specific authentication, authorization and accounting server.

11. A communications apparatus, comprising:
means for receiving, at a base station, a profile associated with a subscriber from an authentication server, wherein there are a plurality of home agents to which registration information from the wireless terminal could be routed, wherein the plurality of home agents are associated with different mobile virtual network operators, wherein the profile comprises a hostname of a home agent that is assigned to a mobile virtual network operator associated with the subscriber;
means for providing a resolution request with respect to the hostname from the base station to a domain name server; and
means for creating a Mobile IP tunnel from the base station to the identified home agent.

12. The communications apparatus of claim 11, wherein the communications apparatus is the base station.

13. The communications apparatus of claim 11 configured to operate in an IP-based cellular system.

14. The communications apparatus of claim 11, further comprising means for routing a registration request of the subscriber to the identified home agent.

15. A non-transitory machine-readable medium as an article of manufacture having stored thereon machine-executable instructions for:
receiving identifying indicia associated with a subscriber;
providing the identifying indicia to an authentication server;
receiving, at a base station, a profile assigned to the subscriber, wherein there are a plurality of home agents to which registration information from the wireless terminal could be routed, wherein the plurality of home agents are associated with different mobile virtual network operators, wherein the profile comprises a hostname of a home agent that is assigned to a mobile virtual network operator associated with the subscriber, and wherein the profile is received from the authentication server;
providing a resolution request with respect to the hostname from the base station to a domain name server; and
routing the registration information from the subscriber to the selected home agent, wherein routing registration information comprises receiving a registration request at a base station and transmitting the registration request from the base station to the selected home agent.

16. A base station comprising the machine-readable medium of claim 15.

17. A processor that executes the following instructions:
receiving, at a base station, a profile associated with a subscriber from an authentication server, wherein there are a plurality of home agents to which registration information from the wireless terminal could be routed, wherein the plurality of home agents are associated with different mobile virtual network operators, wherein the profile comprises a hostname of a home agent that is assigned to a mobile virtual network operator associated with the subscriber;
providing a resolution request with respect to the hostname from the base station to a domain name server; and
creating the Mobile IP tunnel from the base station to the identified home agent.

18. The processor of claim 17 additionally configured to execute the following instructions:
routing a registration request to the identified home agent.

19. A method for determining by an authentication server one or more home agents to associate with a wireless terminal, comprising:
receiving identifying indicia associated with a subscriber using the wireless terminal;
determining, at the authentication server, one or more home agents that are assigned to a mobile virtual network operator associated with the subscriber using the wireless terminal based at least in part upon the identifying indicia, wherein determining the one or more home agents comprises accessing a database that indexes home agents with particular mobile virtual network operators; and
sending, to a base station that is communicatively coupled to the wireless terminal, a profile associated with the subscriber using the wireless terminal, wherein the profile comprises information that identifies the one or more home agents, and wherein the information that identifies the one or more home agents comprises a hostname of a home agent.

20. An authentication server configured to perform the method of claim 19.

21. The method of claim 20, further comprising:
creating the profile associated with the wireless terminal; and
encapsulating the information that identifies the at least one home agent within the profile.

22. An authentication server, comprising:
a memory that includes instructions for:
receiving identifying indicia associated with a subscriber using a wireless terminal;
determining one or more home agents that are assigned to a mobile virtual network operator associated with the subscriber using the wireless terminal based at least in part upon the identifying indicia, wherein determining the one or more home agents comprises accessing a database that indexes home agents with particular mobile virtual network operators; and sending, to a base station that is communicatively coupled to the wireless terminal, a profile associated with the subscriber using the wireless terminal, wherein the profile comprises information that identifies the one or more home agents, and wherein the information that identifies the one or more home agents comprises a hostname of a home agent; and a processor that executes the instructions.

23. An authentication server, comprising:

means for receiving identifying indicia related to a subscriber from a base station that is communicatively coupled to the subscriber;

means for determining a mobile virtual network operator associated with the subscriber based at least in part upon the identifying indicia;

means for determining one or more home agents assigned to the mobile virtual network operator, wherein determining the one or more home agents comprises accessing a database that indexes home agents with particular mobile virtual network operators;

means for assigning the one or more home agents to the subscriber for utilization in registration of a wireless terminal utilized by the subscriber; and means for sending to the base station a profile associated with the subscriber, wherein the profile comprises information that identifies the one or more home agents, wherein the information that identifies the one or more home agents comprises a hostname of a home agent.

24. The authentication server of claim 23, wherein the identifying indicia is a network address indicator.

25. A non-transitory machine-readable medium as an article of manufacture having stored thereon machine-executable instructions for:

receiving identifying indicia related to a subscriber from a base station that is communicatively coupled to the subscriber;

determining a mobile virtual network operator associated with the subscriber based at least in part upon the identifying indicia;

determining one or more home agents assigned to the mobile virtual network operator, wherein determining the one or more home agents comprises accessing a database that indexes home agents with particular mobile virtual network operators;

assigning the one or more home agents to the subscriber for utilization in registration of a wireless terminal utilized by the subscriber; and sending a profile associated with the subscriber from an authentication server to the base station, wherein the profile comprises information that identifies the one or more home agents, and wherein the information that identifies the one or more home agents comprises a hostname of a home agent.

26. A processor that executes the following instructions:

receiving a network address indicator of a subscriber that is requesting access to an IP-based wireless network;

determining a mobile virtual network operator associated with the subscriber based at least in part upon the received network address indicator;

determining one or more home agents assigned to the mobile virtual network operator, wherein determining the one or more home agents comprises accessing a database that indexes home agents with particular mobile virtual network operators;

associating the subscriber with the one or more home agents; and sending a profile associated with the subscriber from an authentication server to the base station, wherein the profile comprises information that identifies the one or more home agents, and wherein the information that identifies the one or more home agents comprises a hostname of a home agent.

27. The method of claim 1, wherein the profile indicates whether the wireless terminal is statically or dynamically addressed.

* * * * *